United States Patent
Song et al.

(10) Patent No.: US 8,018,828 B2
(45) Date of Patent: Sep. 13, 2011

(54) NEAR ML DECODING METHOD BASED ON METRIC-FIRST SEARCH AND BRANCH LENGTH THRESHOLD

(75) Inventors: Iick Ho Song, Daejeon (KR); Tae Hun An, Busan (KR); Jong Ho Oh, Busan (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 143 days.

(21) Appl. No.: 12/468,569

(22) Filed: May 19, 2009

(65) Prior Publication Data

US 2010/0157785 A1 Jun. 24, 2010

(30) Foreign Application Priority Data

Dec. 22, 2008 (KR) ........................ 10-2008-0131259

(51) Int. Cl.
*H04J 11/00* (2006.01)
(52) U.S. Cl. ...................................................... 370/203
(58) Field of Classification Search ................... 370/203
See application file for complete search history.

(56) References Cited

OTHER PUBLICATIONS

Lee et al., "A Metric-First Scheme for MIMO Signal Decoding with Branch Length Threshold", p. 1-5, IEEE Sep. 21-24, 2008.*
Viterbo et al., "A Universal Lattice Code Decoder for Fading Channels", IEEE Transactions on Information Theory, vol. 45, No. 5, pp. 1639-1642, Jul. 1999.
Guo et al., "Reduced Complexity Schnorr-Euchner Decoding Algorithms for MIMO Systems", IEEE Communications Letters, vol. 8, No. 5, pp. 286-288, May 2004.
Angrell et al., "Closest Point Search in Lattices", IEEE Transactions on Information Theory, vol. 48, No. 8, pp. 2201-2214, Aug. 2002.
Kang et al., "Breadth-First Signal Decoder: A Novel Maximum-Likelihood Scheme for Multi-Input-Multi-Output Systems", IEEE Transactions on Vehicular Technology, vol. 57, No. 3, pp. 1576-1584, May 2008.
An et al., A Near ML Decoding Scheme Based on the Metric-First Search for Multiple Input Multiple Output Systems, Proceedings of the 10th lasted International Conference Signal and Image Processing (SIP 2008) Aug. 18-20, 2008, Kailua-Kona, HI, pp. 482-487.
An et al., A Near ML Decoding Scheme with Reduced Complexity for Multiple Input Multiple OUtput Systems, vol. 37 (2008), KICS, Jul. 2-4, 2008.
Lee et al., Department of Electronics Engineering, Mokpo National University, Division of Electrical Engineering, "A Metric-First Scheme for MIMO Signal Decoding with Branch Length Threshold", 2008 IEEE 68th Vehicular Technology Conference, Sep. 21-24, 2008, Calgary, Canada.

* cited by examiner

*Primary Examiner* — Derrick Ferris
*Assistant Examiner* — Mang Yeung
(74) *Attorney, Agent, or Firm* — Birch, Stewart, Kolasch & Birch, LLP

(57) ABSTRACT

In this invention, we propose a near maximum likelihood (ML) method for the decoding of multiple input multiple output systems. By employing the metric-first search method, Schnorr-Euchner enumeration, and branch length thresholds in a single frame systematically, the proposed technique provides a higher efficiency than other conventional near ML decoding schemes. From simulation results, it is confirmed that the proposed method has lower computational complexity than other near ML decoders while maintaining the bit error rate (BER) very close to the ML performance. The proposed method in addition possesses the capability of allowing flexible tradeoffs between the computational complexity and BER performance.

2 Claims, 16 Drawing Sheets

|  | DELTA | efficient QRD-M | QRD-Stack | SE2 |
|---|---|---|---|---|
| search method | metric-first | breadth-first | metric-first | depth-first |
| estimate of SNR | not required | not required | not required | required |
| SE enumeration | employed | not employed | not employed | employed |
| simultaneous consideration of multiple nodes | yes | yes | yes | no |
| number of branches formed from a best node | 0 or 1 | $\sqrt{L}$ | $\sqrt{L}$ | 0 or 1 |
| metric compared to threshold | branch metric | node metric | (not applicable) | biased node metric |

NEAR ML DECODING METHOD BASED ON METRIC-FIRST SEARCH AND BRANCH LENGTH THRESHOLD

FIELD OF THE INVENTION

The present invention relates generally to wireless communication systems, and more particularly to decoding method for use in multiple input multiple output (MIMO) wireless communication systems.

BACKGROUND OF THE INVENTION

It is well known that MIMO systems can provide high spectral efficiency compared to single input single output (SISO) systems for wireless communications. The MIMO system is considered one of the principal technologies for the next generation mobile communication because no additional bandwidth or transmit power is required to increase the capacity of the system. As in the case of SISO systems, several decoding schemes have been considered in many studies for the decoding of MIMO systems. Among the decoding schemes for MIMO systems, the maximum likelihood (ML) decoder provides the optimal bit error rate (BER) performance at the expense of quite severe computational requirement.

The sphere decoder (SD) has been introduced as an interesting means to reduce the excessive computational complexity of the conventional full-search ML decoder. The breadth-first signal decoder (BSIDE) has recently been proposed and shown to have lower computational complexity than the SD in general. Despite various studies for designing ML decoders with a reduced computational complexity, however, the computational complexity of the ML decoders is still somewhat higher than that of practical systems.

In a number of studies, several near ML decoders with a reasonable loss in the BER performance have been proposed to achieve lower computational complexity for the decoding of MIMO systems. Most of the near ML decoders perform QR decomposition (QRD) of the channel matrix and regard the decoding problem as a problem of searching for a lattice point with the smallest node metric by employing the depth-, breadth-, or metric-first search method on a tree.

Among a variety of near ML decoders, Schnorr-Euchner2 (SE2) scheme and increasing radii algorithm (IRA) have been proposed to alleviate the exponentially growing computational complexity of the depth-first search when the number of layers increases. As variants of the SD, the SE2 and IRA both employ unique methods for the determination of the threshold and repeat searching the tree back and forth to find a node with the smallest metric. The SE2 scheme reduces the computational complexity based on Schnorr-Euchner (SE) enumeration with a Fano-like metric bias and an early termination technique. On the other hand, the IRA reduces the computational complexity by pruning the search space statistically, offering substantial computational savings when the number of antennas is large. Although the SE2 and IRA both achieve near ML performance with low computational complexity, the SE2 requires an estimate of the signal to noise ratio (SNR) and the IRA is required to restart the search from the beginning with an increased radius when no feasible point is found.

As for the decoding schemes based on the breadth-first search method, the QRD-M scheme is based on the classical M-algorithm and exhibits quite a low computational complexity, searching the tree only in the 'forward' direction from the root of a tree. In order to prevent a full search of the tree, the QRD-M retains only M nodes with the smallest node metric in each layer. The adaptive QRD-M and efficient QRD-M schemes have also been proposed to further reduce the computational complexity of the QRD-M. The efficient QRD-M achieves a reduction in the computational complexity by discarding a node when the node metric is larger than a threshold: however, the partial decision feedback equalizer (DFE) solution and the Euclidean distance of the DFE solution need to be computed in each layer.

Based on the metric-first search, the QRD-Stack scheme relies on the stack algorithm and searches branches extended from a node with the smallest node metric. Although the QRD-Stack allows a low computational complexity by retaining only a few nodes for search, backtracking is quite frequent at low SNR since a number of nodes, not necessarily in the same layer, are considered simultaneously.

SUMMARY OF THE INVENTION

In this invention, we propose a near ML decoding method, called decoding with expected length and threshold approximated (DELTA). The DELTA is a novel scheme incorporating the metric-first search, SE enumeration, and branch length threshold in a single frame systematically for the decoding of MIMO systems. A novel method obtaining the branch length threshold is also proposed in this invention. The proposed threshold is a measure of the expected length of the paths from the parent node of a best node to a node in the first layer, and has the distinct characteristic that the threshold can be obtained by using the channel matrix only. Based on the metric-first search and by employing the branch length threshold and SE enumeration, the DELTA searches the tree in the unique way not considered before. Specifically, the DELTA (1) finds a node with the smallest node metric in the tree, (2) determines if the node deserves to be searched, and (3) connects, from the node and its parent node, one branch each at a time. Therefore, by avoiding unnecessary backtracking and connections of nodes during the search, the DELTA provides a lower computational complexity than other near ML decoders, especially when the SNR is low. The DELTA in addition allows flexible tradeoffs between the computational complexity and BER performance.

BRIEF DESCRIPTION OF THE DRAWINGS

FIG. 5 shows some characteristics of various near ML decoding schemes.

DETAILED DESCRIPTION OF THE INVENTION

Figure 1:
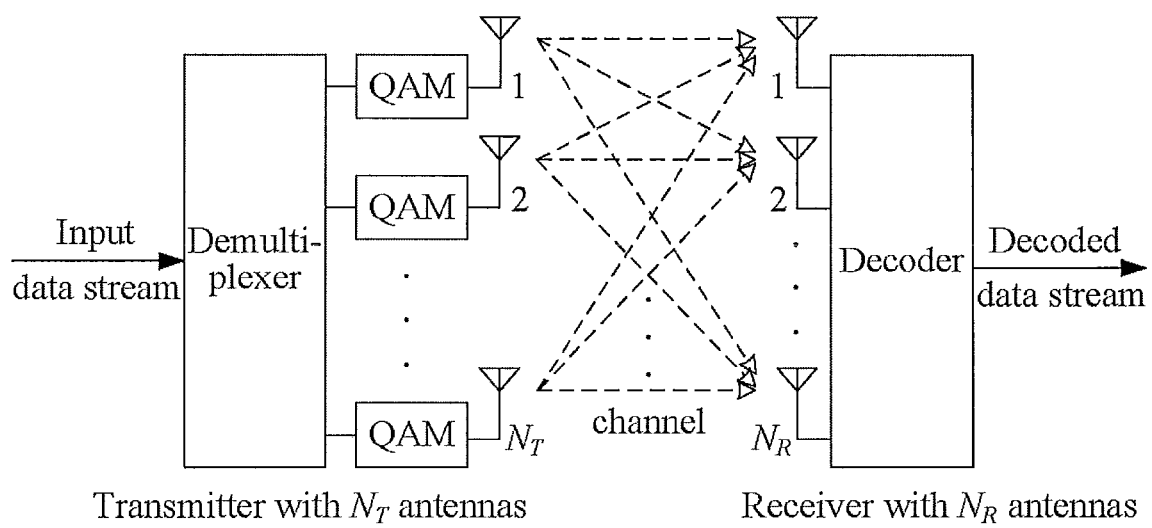
FIG. 1 shows a block diagram of the MIMO system with $N_T$ transmit and $N_R$ receive antennas.

FIG. 1 shows a block diagram of the MIMO system with $N_T$ transmit and $N_R$ receive antennas. We assume that the data stream is demultiplexed into $N_T$ sub-streams and then sent simultaneously from the $N_T$ transmit antennas to the $N_R$ receive antennas over a rich-scattering, flat fading wireless channel. It is also assumed that a common quadrature amplitude modulation (QAM) is employed for all the sub-streams. Then, denoting by $\tilde{y}_j$ the complex signal received at the j-th receive antenna, the discrete-time baseband model of the received signal vector $\underline{\tilde{y}}=[\tilde{y}_1, \tilde{y}_2, \ldots, \tilde{y}_{N_R}]^T$ can be expressed as $$\underline{\tilde{y}}=\tilde{H}\underline{\tilde{s}}+\underline{\tilde{v}}, \quad (1)$$

where the superscript T indicates the vector transpose, $\tilde{H}$ is the $N_R \times N_T$ channel matrix of independent and identically distributed (i.i.d.) complex Gaussian random variables with mean zero and unit variance, $\underline{\tilde{s}}=[\tilde{s}_1, \tilde{s}_2, \ldots, \tilde{s}_{N_T}]^T$ is the transmitted signal vector, and $\underline{\tilde{v}}=[\tilde{v}_1, \tilde{v}_2, \ldots, \tilde{v}_{N_R}]^T$ is the vector of i.i.d. complex additive Gaussian random variables with mean zero and variance $\sigma^2$. We assume that the estimation of the channel matrix $\tilde{H}$ has been completed before the decoding at the receiver.

Denoting by $\Re(\bullet)$ and $\Im(\bullet)$ the real and imaginary parts, respectively, the complex baseband model (1) can be transformed into a real representation as $$\underline{y} = \begin{pmatrix} \Re(\underline{\tilde{y}}) \\ \Im(\underline{\tilde{y}}) \end{pmatrix} \quad (2)$$
$$= \begin{pmatrix} \Re(\tilde{H}) & -\Im(\tilde{H}) \\ \Im(\tilde{H}) & \Re(\tilde{H}) \end{pmatrix} \begin{pmatrix} \Re(\underline{\tilde{s}}) \\ \Im(\underline{\tilde{s}}) \end{pmatrix} + \begin{pmatrix} \Re(\underline{\tilde{v}}) \\ \Im(\underline{\tilde{v}}) \end{pmatrix}$$
$$= Hs + \underline{v}.$$

In (2), $\underline{y}=[y_1, y_2, \ldots, y_n]^T$ is the real received signal vector, $\underline{s}=[s_1, s_2, \ldots, s_m]^T$ is the real transmitted signal vector, and $\underline{v}=[v_1, v_2, \ldots, v_n]^T$ is the vector of real i.i.d. additive Gaussian noise with mean zero and variance $\sigma^2/2$, where $$m=2N_T \quad (3)$$

and $$n=2N_R. \quad (4)$$

For simplicity, it is assumed in this invention that n=m without loss of generality.

Let us first QR decompose the channel matrix H, where Q is an m×m unitary matrix such that $$Q^T Q = I \quad (5)$$

and $R=[r_{i,j}]$ is an m×m upper triangular matrix. Multiplying both sides of (2) by $Q^T$, we have $$\underline{r} = R\underline{s} + \underline{w}, \quad (6)$$

where $$\underline{r} = Q^T \underline{y} \quad (7)$$
$$= [r_1, r_2, \ldots, r_m]^T$$

and $\underline{w}=Q^T \underline{v}$. Note that the statistical properties of the noise term $\underline{w}$ in (6) are the same as those of $\underline{v}$ in (2) because of (5).

Assuming that we consider the signal constellation $$\mathcal{A} = \left\{ -\frac{\sqrt{L}-1}{2}, -\frac{\sqrt{L}-3}{2}, \ldots, \frac{\sqrt{L}-3}{2}, \frac{\sqrt{L}-1}{2} \right\} \quad (8)$$

of L-QAM with L=4, 16, ..., the set $\{R\underline{s}\}$ of vectors in (6) is a subset of the infinite lattice $$\Lambda(R) = \{R\underline{s}: \underline{s} \in \mathcal{A}_\infty^m\} \quad (9)$$

generated by R, where $$\mathcal{A}_\infty = \left\{ a + \frac{1}{2}: a \in \mathbb{Z} \right\} \quad (10)$$

is an infinite augmentation of $\mathcal{A}$ with $\mathbb{Z}$ denoting the set of all integers. Then, the vector r of received signals can be considered as a perturbed lattice point due to the noise w. Therefore, given the vector $\underline{r}$ and matrix R, the optimal solution $\hat{\underline{s}}$ is obtained as $$\hat{\underline{s}} = \arg\min_{\underline{s} \in \mathcal{A}^m} \|\underline{r} - R\underline{s}\|^2 \quad (11)$$
$$= \arg\min_{\underline{s} \in \mathcal{A}^m} \sum_{i=1}^{m} \left( r_i - \sum_{j=i}^{m} r_{i,j} s_j \right)^2,$$

where $\|\bullet\|$ denotes the Euclidean norm.

Figure 2:
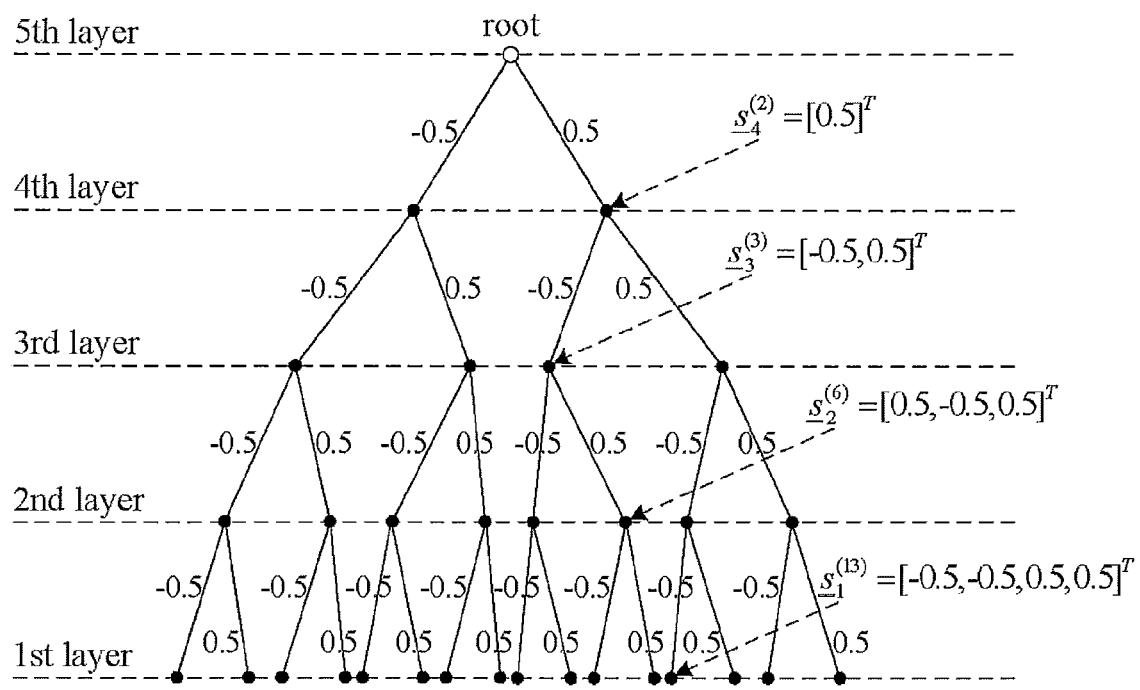
FIG. 2 is an example of the tree when m=4 and L=4.

Exploiting the upper triangular property of the matrix R, the tree structure is used quite frequently to find the ML or near ML solution in the decoding of MIMO systems. Let us consider a $\sqrt{L}$-ary tree with m+1 layers stemmed from a root located in the (m+1)-st layer, the highest layer. Then, a branch between the (k+1)-st and k-th layers of the tree denotes a possible value ($\in \mathcal{A}$) of the k-th element $s_k$ of the real transmitted signal vector s, and a node of the tree denotes the vector of the branches in the unique path connecting the node and root. We will denote the l-th node in the k-th layer by the (m−k+1)-dimensional vector $$\underline{s}_k^{(l)} = [s_{k,k}^{(l)}, s_{k+1,k}^{(l)}, \ldots, s_{m,k}^{(l)}]^T \quad (12)$$

for k=1,2,...,m and l=1,2,...,$\sqrt{L}^{m-k+1}$, with the root denoted by $\underline{s}_{m+1}^{(1)}$ for convenience. An example of the tree for m=4 and L=4 is shown in FIG. 2.

Let us define the node metric of a node as the sum of the lengths (metrics) of the branches of the unique path connecting the node and root. Specifically, defining the length $\phi(\underline{s}_k^{(l)})$ of the branch between a node $\underline{s}_k^{(l)}$ and its parent node $$\underline{s}_{k+1}^{(p)} = [s_{k+1,k+1}^{(p)}, s_{k+2,k+1}^{(p)}, \ldots, s_{m,k+1}^{(p)}]^T \quad (13)$$
$$= [s_{k+1,k}^{(l)}, s_{k+2,k}^{(l)}, \ldots, s_{m,k}^{(l)}]^T$$

as $$\varphi(\underline{s}_k^{(l)}) = \left(r_k - \sum_{j=k}^{m} r_{k,j} s_{j,k}^{(l)}\right)^2 \quad (14)$$
$$= e_k^2(\underline{s}_k^{(l)}),$$

the node metric $\Phi(\underline{s}_k^{(l)})$ of $\underline{s}_k^{(l)}$ can be obtained as $$\Phi(\underline{s}_k^{(l)}) = \sum_{i=k}^{m} \varphi(\underline{s}_i^{(p_i)}) \quad (15)$$
$$= \sum_{i=k}^{m} \left(r_i - \sum_{j=i}^{m} r_{i,j} s_{j,i}^{(p_i)}\right)^2$$
$$= \sum_{i=k}^{m} \left(r_i - \sum_{j=i}^{m} r_{i,j} s_{j,k}^{(l)}\right)^2$$
$$= \sum_{i=k}^{m} e_i^2(\underline{s}_k^{(l)}),$$

where $$e_i(\underline{s}_k^{(l)}) = r_i - \sum_{j=max(i,k)}^{m} r_{i,j} s_{j,k}^{(l)} \quad (16)$$

and $s_{i+1}^{(p_{i+1})}$ is the parent node of $s_i^{(p_i)}$ for i=k,k+1, . . . ,m with $p_k=l$ and $p_{m+1}=1$. Note that we have used $$s_{j,i}^{(p_i)} = s_{j,k}^{(l)} \quad (17)$$

for i=k,k+1, . . . , m and j=i,i+1, . . . , m in obtaining the third line from the second line of (15).

It is straightforward to see that the problem described by (11) of finding the optimal solution $\hat{s} \in A^m$ is equivalent to the problem of finding the node $\underline{s}_1^{(l)}$ with the smallest node metric $\Phi(\underline{s}_1^{(l)})$ among the vectors $$\{\underline{s}_1^{(1)}, \underline{s}_1^{(2)}, \ldots, \underline{s}_1^{(\sqrt{L}^m)}\} \quad (18)$$

in the first layer of the tree.

Let us make some definitions before we describe the proposed decoding scheme, the DELTA, in detail.

Leaf node: a node not connected to any of the nodes in lower layers.

Deepest node: a node in the lowest layer among the leaf nodes.

Best node: a node with the smallest node metric among the leaf nodes.

Best branch: the branch of a node with the smallest length among the branches not considered previously.

Clearly, there may exist two or more deepest nodes at any instant during the search over a tree. On the other hand, it is straightforward to see that the best branch of a node and the best node are unique with probability one.

In the metric-first search methods, the best node is determined among the leaf nodes not necessarily in the same layer, and then branches are connected from the best node to the nodes in the layer immediately below, making new leaf nodes. The algorithm continues until a best node in the first layer is found. The metric-first search methods generally offer good performance with moderate computational complexity when the SNR is high, but exhibit high computational complexity when the SNR is low because of frequent backtracking. In addition, when a best node is found, all branches from the best node are connected, resulting in unnecessary connection and consideration of nodes. The computational complexity therefore increases considerably as the size of signal constellation and number of antennas increase.

The number of branches considered from a best node can be reduced by connecting only one branch at a time starting from the best branch, which can be made possible by utilizing the SE enumeration frequently employed to improve the efficiency of the tree search. Specifically, let Q(•) denote the quantization of (•) to the nearest element in the set A: for example, Q(-0.2)=-0.5 and Q(2.1)=1.5 when A={-1.5,-0.5, 0.5,1.5}. Then, after obtaining the best branch $S(\underline{s}_k^{(l)})$ of $\underline{s}_k^{(l)}$ as $$S(\underline{s}_k^{(l)}) = Q\left(\frac{e_{k-1}(\underline{s}_k^{(l)})}{r_{k-1,k-1}}\right), \quad (19)$$

the branches $\{B_j(\underline{s}_k^{(l)})\}_{j=1}^{\sqrt{L}}$ from $\underline{s}_k^{(l)}$ to nodes in layer k-1 can be arranged in the ascending order of the branch lengths as $$\{S(\underline{s}_k^{(l)}), S(\underline{s}_k^{(l)})+1, S(\underline{s}_k^{(l)})-1, S(\underline{s}_k^{(l)})+2, S(\underline{s}_k^{(l)})-2, \ldots\} \cap A, \quad (20)$$
$$\text{if } S(\underline{s}_k^{(l)}) \leq \frac{e_{k-1}(\underline{s}_k^{(l)})}{r_{k-1,k-1}},$$

$$\{S(\underline{s}_k^{(l)}), S(\underline{s}_k^{(l)})-1, S(\underline{s}_k^{(l)})+1, S(\underline{s}_k^{(l)})-2, S(\underline{s}_k^{(l)})+2, \ldots\} \cap A,$$
$$\text{if } S(\underline{s}_k^{(l)}) > \frac{e_{k-1}(\underline{s}_k^{(l)})}{r_{k-1,k-1}}$$

with the SE enumeration. In essence, employing the re-arrangement by the SE enumeration, the branches can be considered in a more systematic way and the probability of searching only promising branches is maximized.

Based on the metric-first search and SE enumeration, the DELTA searches a tree starting from the root. Specifically, as an advanced variant of the metric-first search method, the DELTA (1) finds a best node in the tree, (2) determines if the best node deserves to be searched, and (3) considers one branch at a time starting from the best branch of the best node. More specifically, the DELTA can be described by the three steps below.

Step 1: Determining the Best Node

The metrics of all the leaf nodes, not necessarily in the same layer, are compared and the best node is selected.

Step 2: Checking the Layer of the Best Node

If the best node determined in Step 1 is a deepest node, we take Step 2-1. If the best node is not a deepest node, on the other hand, we take Step 2-2.

(A) Step 2-1. Checking if the Best Node is in the First Layer

If the best node is in the first layer, the best node is declared the solution and the search is terminated because, with probability one, any other node not searched yet has a node metric larger than or equal to that of the best node. On the other hand, if the best node is not in the first layer, we take Step 3, continuing the search by making a new leaf node in the layer immediately below.

(B) Step 2-2: Determining if the Best Node Deserves to be Searched

When the best node is not a deepest node, to reduce the computational complexity incurred from searching the same layers unnecessarily, we determine if the best node deserves further consideration by taking into account the expected length to the first layer. Specifically, when the best node is $\underline{s}_k^{(l)}$, we compare the length $\phi(\underline{s}_k^{(l)})$ of the branch between $\underline{s}_k^{(l)}$ and its parent node with the threshold $$\gamma_k^2 = \left\{ \frac{\Gamma\left(\frac{k}{2}+1\right)}{\pi^{\frac{k}{2}}} \prod_{i=1}^{k} |r_{i,i}| \right\}^{\frac{2}{k}}. \quad (21)$$

If $\phi(\underline{s}_k^{(l)}) \leq \gamma_k^2$, we regard $\underline{s}_k^{(l)}$ deserves further consideration and take Step 3. If $\phi(\underline{s}_k^{(l)}) > \gamma_k^2$, on the other hand, we regard $\underline{s}_k^{(l)}$ does not deserve further consideration: consequently, we discard $\underline{s}_k^{(l)}$ and then return to Step 1. This procedure keeps us from unnecessary search and results in considerable reduction of computational complexity.

Before we delineate in detail the third step of the DELTA, let us explain the rationale behind the threshold $\gamma_k^2$ shown in (21). Interpreting physically, the threshold $\gamma_k^2$ is a measure of the expected length of (i.e., the expected value of the sum of the lengths of the segments along) the paths from the parent node of a best node in layer k to a node in the first layer as we shall see shortly: taking the expected length into account, the threshold is derived as follows.

Basically, we are interested in the shortest path among all the paths from the parent node to a node in the first layer and expect the best node to be in the shortest path. Consider the parent node $\underline{s}_{k+1}^{(p)}$ of the best node $\underline{s}_k^{(l)}$ and a node $$\underline{s}_1^{(f)} = [s_{1,1}^{(f)}, s_{2,1}^{(f)}, \ldots, s_{m,1}^{(f)}]^T \quad (22)$$

in the first layer of the shortest path, where $$s_{j,1}^{(f)} s_{j,k}^{(l)} \quad (23)$$

for j=k+1, k+2, ..., m. Since the length of a branch is nonnegative as is apparent from (14), if $\underline{s}_k^{(l)}$ is in the shortest path, the length $L_{k+1,1}$ of the shortest path connecting $\underline{s}_{k+1}^{(p)}$ and $\underline{s}_1^{(f)}$ should be larger than or equal to the length $\phi(\underline{s}_k^{(l)})$ between $\underline{s}_k^{(l)}$ and $\underline{s}_{k+1}^{(p)}$: that is, we have $$\phi(\underline{s}_k^{(l)}) \leq L_{k+1,1}. \quad (24)$$

Now, using (23), the length $L_{k+1,1}$ can be rewritten as $$\mathcal{L}_{k+1,1} = \sum_{i=1}^{k} \left( r_i - \sum_{j=i}^{m} r_{i,j} s_{j,1}^{(f)} \right)^2 \quad (25)$$

$$= \sum_{i=1}^{k} \left( r_i - \sum_{j=k+1}^{m} r_{i,j} s_{j,k}^{(l)} - \sum_{j=i}^{k} r_{i,j} s_{j,1}^{(f)} \right)^2$$

$$= \sum_{i=1}^{k} \left( e_i(\underline{s}_{k+1}^{(p)}) - \sum_{j=i}^{k} r_{i,j} s_{j,1}^{(f)} \right)^2$$

$$= \| \underline{r}_k' - R_k \underline{s}_k \|^2,$$

implying that we can interpret $L_{k+1,1}$ as the square of the distance between a transformed received signal vector $\underline{r}_k'$ and a lattice point $R_k \underline{s}_k$ in the k-dimensional lattice $$\Lambda_k(R_k) = \{R_k \underline{s}_k : \underline{s}_k \in A^k\} \quad (26)$$

generated by the submatrix $$R_k = \begin{pmatrix} r_{1,1} & r_{1,2} & \cdots & r_{1,k} \\ 0 & r_{2,2} & \cdots & r_{2,k} \\ \vdots & \vdots & \ddots & \vdots \\ 0 & 0 & \cdots & r_{k,k} \end{pmatrix} \quad (27)$$

of R, where $$\underline{r}_k' = [e_1(\underline{s}_{k+1}^{(p)}), e_2(\underline{s}_{k+1}^{(p)}), \ldots, e_k(\underline{s}_{k+1}^{(p)})]^T \quad (28)$$

and $$\underline{s}_k = [s_{1,1}^{(f)}, s_{2,1}^{(f)}, \ldots, s_{k,1}^{(f)}]^T. \quad (29)$$

Note that $L_{k+1,1}$ is the smallest value among all the lengths of paths from $\underline{s}_{k+1}^{(p)}$ to a node in the first layer. Apparently, the smallest value is obtained when $R_k \underline{s}_k$ is the closest lattice point, among all the lattice points in the lattice $\Lambda_k(R_k)$, from $\underline{r}_k'$. In other words, to have the smallest value for $L_{k+1,1}$, $\underline{r}_k'$ should be included in the Voronoi region $$\mathcal{V}(\Lambda_k(R_k), \underline{s}_k) = \{\underline{r}_k' \in \mathbb{R}^k : \|\underline{r}_k' - R_k \underline{s}_k\| \leq \|\underline{r}_k' - R_k \underline{\tilde{s}}_k\|, \forall R_k \underline{\tilde{s}}_k \in \Lambda_k(R_k)\} \quad (30)$$

of the lattice point $R_k \underline{s}_k$, where $\mathbb{R}$ denotes the set of real numbers. Note that the Voronoi region (30) denotes the set of all vectors $\underline{r}_k'$ closer to $R_k \underline{s}_k$ than to any other lattice point in $\Lambda_k(R_k)$.

Next, as the exact boundary of a Voronoi region is unfortunately rather impossible to describe succinctly in most cases, let us approximate the k-dimensional Voronoi region $\mathcal{V}(\Lambda_k(R_k), \underline{s}_k)$ by the k-dimensional hypersphere centered at $R_k \underline{s}_k$ with the same volume. Here, because the volume of the Voronoi region of a lattice point in a finite lattice varies depending on the location of the lattice point, we evaluate the volume of the Voronoi region of $R_k \underline{s}_k$ in the infinite lattice $\Lambda(R_k)$ instead of that in the finite lattice $\Lambda_k(R_k)$: in other words, we assume $$Vol(\mathcal{V}(\Lambda_k(R_k), \underline{s}_k)) = Vol(\mathcal{V}(\Lambda(R_k), \underline{s}_k)), \quad (31)$$

where $$Vol(\mathcal{V}(\Lambda(R_k), \underline{s}_k)) = \sqrt{\det(R_k^T R_k)} \quad (32)$$

$$= \prod_{i=1}^{k} |r_{i,i}|$$

for all $\underline{s}_k$. Then, equating $$\prod_{i=1}^{k} |r_{i,i}|$$

with the volume $$\frac{\pi^{k/2}}{\Gamma(k/2+1)} d^k \quad (33)$$

of the k-dimensional hypersphere with radius d, we get $$d = \left(\frac{\Gamma\left(\frac{k}{2}+1\right)}{\pi^{\frac{k}{2}}}\prod_{i=1}^{k}|r_{i,i}|\right)^{\frac{1}{k}} \quad (34)$$
$$= \gamma_k.$$

In short, the threshold is the radius squared of the hypersphere obtained by approximating the Voronoi region of the closest lattice point from $\underline{r}_k'$ as the k-dimensional hypersphere with the same volume.

Now, for any point $\underline{r}_k'$ in the Voronoi region approximated by the hypersphere, we have $$\|\underline{r}_k' - R_k \underline{s}_k\|^2 \leq d^2. \quad (35)$$

Together with (24) and (25), inequality (35) can be used to obtain $$\Phi(\underline{s}_k^{(l)}) \leq \gamma_k^2 \quad (36)$$

as a condition for $\underline{s}_k^{(l)}$ to satisfy in order to have any 'margin' in length to the first layer. In other words, the result (36) implies that, only when (36) is satisfied, the path from the root to $\underline{s}_k^{(l)}$ is short enough for $\underline{s}_k^{(l)}$ to deserve further search or consideration. If $\phi(\underline{s}_k^{(l)}) > \gamma_k^2$, on the other hand, $\underline{s}_k^{(l)}$ is not in the shortest path, which means that $\underline{s}_k^{(l)}$ does not deserve further consideration.

Step 3: Adding New Leaf Nodes

Again, let us denote the best node passed through Step 2 by $\underline{s}_k^{(l)}$ and the parent node of $\underline{s}_k^{(l)}$ by $\underline{s}_{k+1}^{(p)}$. We decide the best branch $S(\underline{s}_k^{(l)})$ of $\underline{s}_k^{(l)}$ with (19) and connect $\underline{s}_k^{(l)}$ to $$\underline{s}_{k-1}^{(c)} = [S(\underline{s}_k^{(l)}), \underline{s}_k^{(l)}]^T \quad (37)$$

in the (k−1)-st layer. Then, we compute the branch length $$\phi(\underline{s}_{k-1}^{(c)}) = \{e_{k-1}(\underline{s}_k^{(l)}) - r_{k-1,k-1} s_{k-1,k-1}^{(c)}\}^2 \quad (38)$$

to obtain the node metric $\Phi(\underline{s}_{k-1}^{(c)})$ of $\underline{s}_{k-1}^{(c)}$ as $$\Phi(\underline{s}_{k-1}^{(c)}) = \Phi(\underline{s}_k^{(l)}) + \phi(\underline{s}_{k-1}^{(c)}), \quad (39)$$

where $\Phi(\underline{s}_k^{(l)})$ has previously been computed in the k-th layer.

(A) Step 3-1: When There Remains No Branch from the Parent Node

If $\underline{s}_k^{(l)}$ is the root or if all the branches of $\underline{s}_{k+1}^{(p)}$ have already been connected, we take Step 1.

(B) Step 3-2: When There Remains at Least One Branch from the Parent Node

On the other hand, if $\underline{s}_k^{(l)}$ is not the root and $\underline{s}_{k+1}^{(p)}$ has at least one branch not connected yet, we connect the best branch from $\underline{s}_{k+1}^{(p)}$ to form a new leaf node, and then discard a node with the largest metric if necessary.

Specifically, let us first define the (j+1)-st 'branch increment' of $\underline{s}_{k+1}^{(p)}$ by $$\Delta_{j+1}(\underline{s}_{k+1}^{(p)}) = \begin{cases} \mathrm{sgn}\left(\frac{e_k(\underline{s}_{k+1}^{(p)})}{r_{k,k}} - s_{k,k}^{(l)}\right), & \text{when } j=0, \\ -\Delta_j(\underline{s}_{k+1}^{(p)}) - \mathrm{sgn}(\Delta_j(\underline{s}_{k+1}^{(p)})), & \text{when } j=1,2,\ldots, \end{cases} \quad (40)$$

where $$\mathrm{sgn}(x) = \begin{cases} 1, & x \geq 0, \\ -1, & x < 0. \end{cases} \quad (41)$$

Then, when b branch increments of $\underline{s}_{k+1}^{(p)}$ have already been computed, the best branch $S(\underline{s}_{k+1}^{(p)})$ of $\underline{s}_{k+1}^{(p)}$ is obtained as $$S(\underline{s}_{k+1}^{(p)}) = \begin{cases} s_{k,k}^{(l)} + \Delta_{b+1}(\underline{s}_{k+1}^{(p)}), & \text{if } s_{k,k}^{(l)} + \Delta_{b+1}(\underline{s}_{k+1}^{(p)}) \in A, \\ s_{k,k}^{(l)} + \Delta_{b+1}(\underline{s}_{k+1}^{(p)}) + \Delta_{b+2}(\underline{s}_{k+1}^{(p)}), & \text{if } s_{k,k}^{(l)} + \Delta_{b+1}(\underline{s}_{k+1}^{(p)}) \notin A. \end{cases} \quad (42)$$

(Note that we can compute the increments recursively with only one storing element. In addition, if we compute $\Delta_1(\underline{s}_{k+1}^{(p)})$ right after we have obtained $\underline{s}_{k+1}^{(p)}$ using (19), we can avoid the division of $e_k(\underline{s}_{k+1}^{(p)})/r_{k,k}$ saving some computation.) Then, we connect $\underline{s}_{k+1}^{(p)}$ with $$\underline{s}_k^{(l')} = [S(\underline{s}_{k+1}^{(p)}), \underline{s}_{k+1}^{(p)}]^T \quad (43)$$

and compute the branch length $$\phi(\underline{s}_k^{(l')}) = \{e_k(\underline{s}_{k+1}^{(p)}) - r_{k,k} s_{k,k}^{(l')}\}^2 \quad (44)$$

of $\underline{s}_k^{(l')}$ to obtain the node metric $\Phi(\underline{s}_k^{(l')})$ of $\underline{s}_k^{(l')}$ as $$\Phi(\underline{s}_k^{(l')}) = \Phi(\underline{s}_{k+1}^{(p)}) + \phi(\underline{s}_k^{(l')}) \quad (45)$$
$$= \Phi(\underline{s}_k^{(l)}) - \phi(\underline{s}_k^{(l)}) + \phi(\underline{s}_k^{(l')}).$$

Note that $e_k(\underline{s}_{k+1}^{(p)})$ in (44) has already been computed and stored when $\bar{S}(\underline{s}_{k+1}^{(p)})$ was obtained using (19), and $\Phi(\underline{s}_k^{(l)})$ and $\phi(\underline{s}_k^{(l)})$ in (45) have already been computed and stored when $\underline{s}_k^{(l)}$ was connected with $\underline{s}_{k+1}^{(p)}$. Therefore, we can compute $\Phi(\underline{s}_k^{(l')})$ without storing $\Phi(\underline{s}_{k+1}^{(p)})$. Next, if there are more than N leaf nodes (in which case, the number of leaf nodes ought to be N+1), we retain only N leaf nodes including $\underline{s}_{k-1}^{(c)}$ by discarding a node with the largest node metric among the leaf nodes not taking $\underline{s}_{k-1}^{(c)}$ into account. Then, we return to Step 1.

Figure 3:
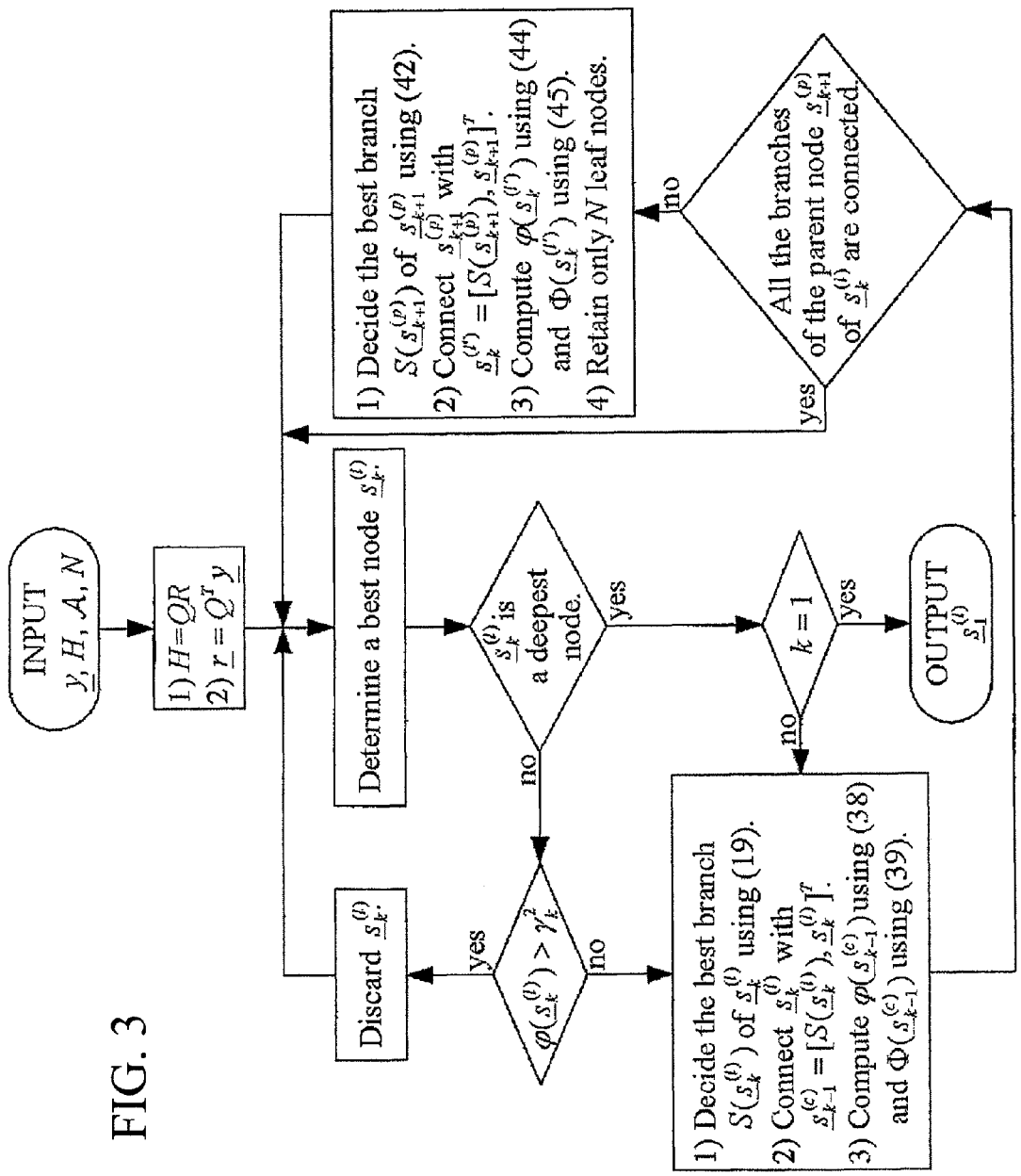
FIG. 3 is a flow chart of the DELTA.
Figure 4:
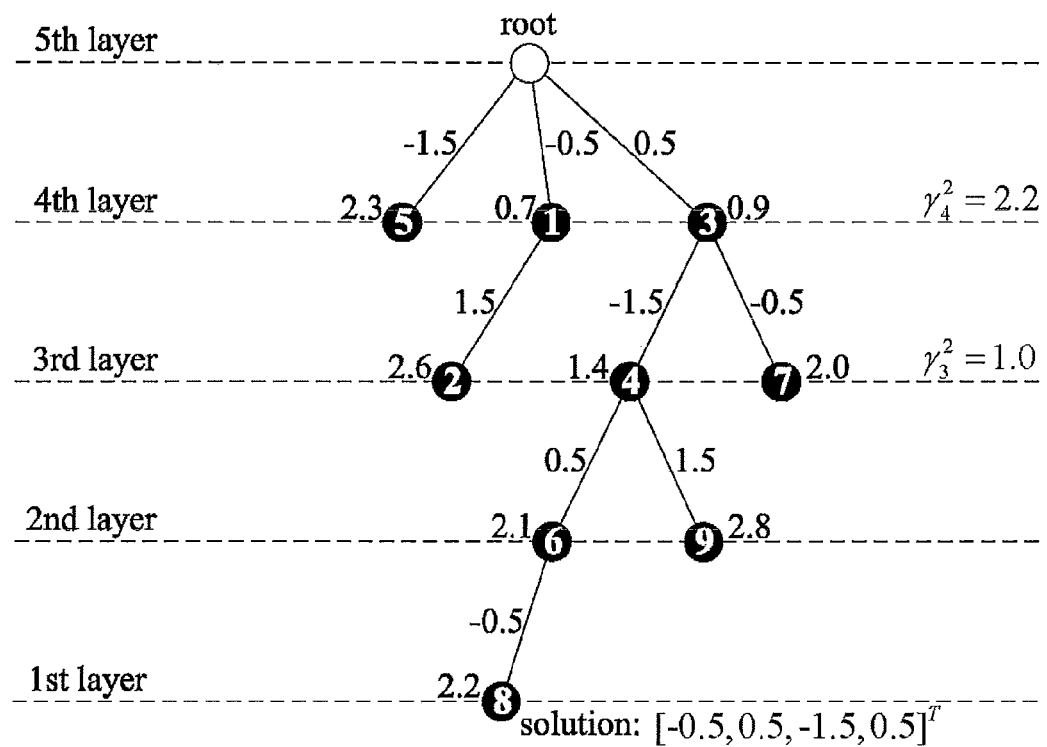
FIG. 4 is an example of the tree searching with the DELTA.
Figure 6:
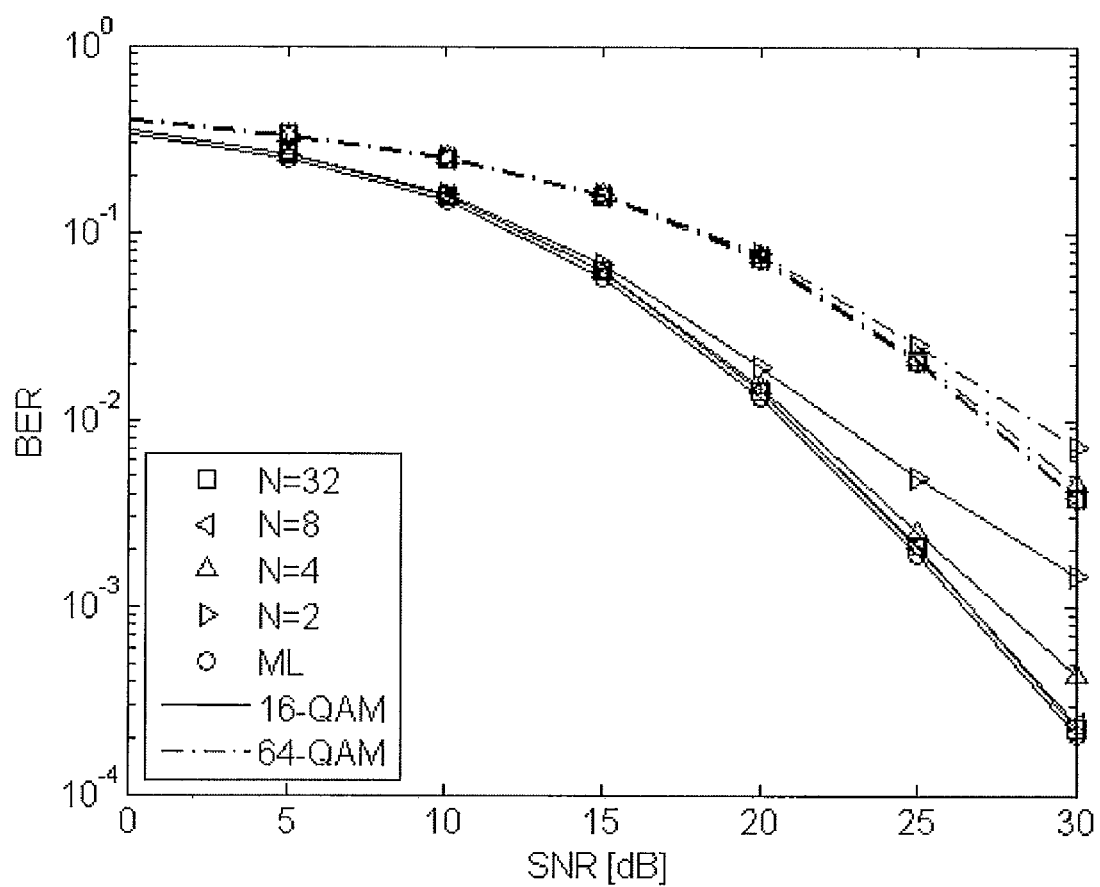
FIG. 6 shows the BER performance of the DELTA for various values of N in 16- and 64-QAM when $N_T=N_R=2$.
Figure 7:
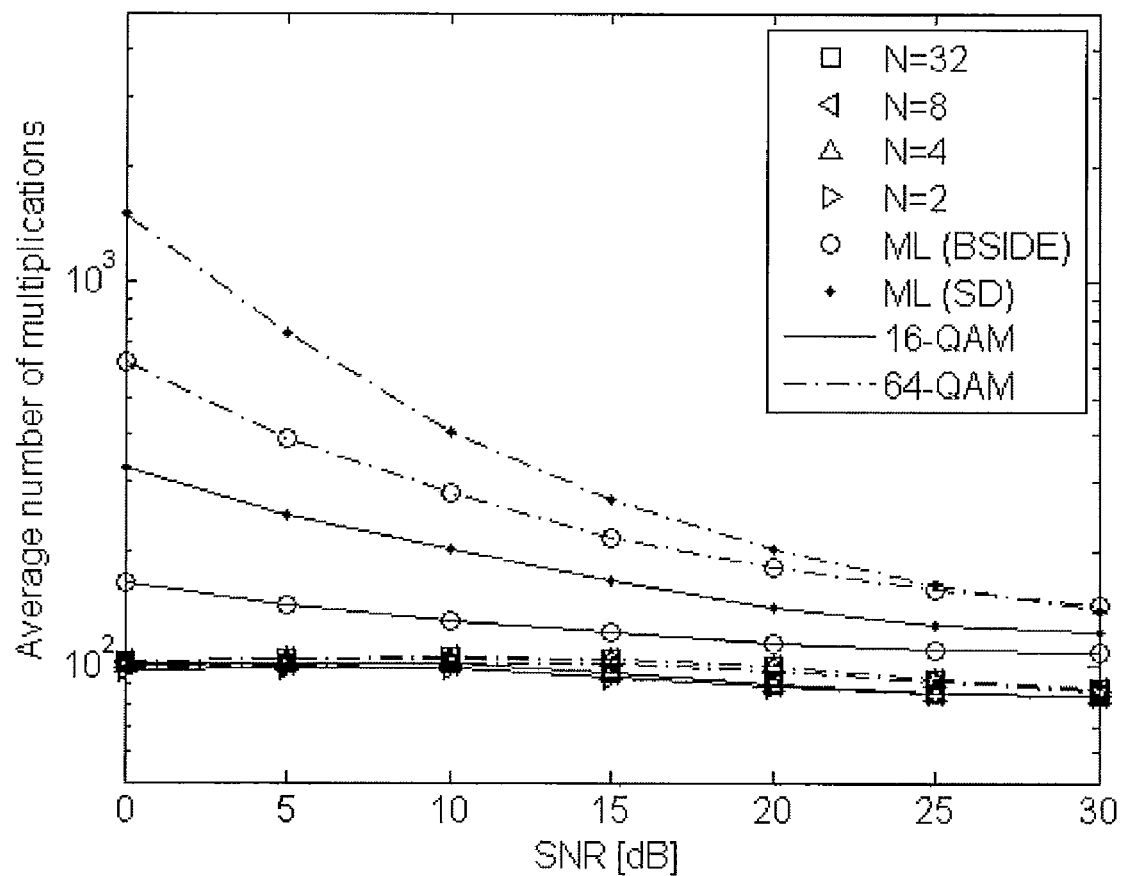
FIG. 7 shows the average number of multiplications of the DELTA for various values of N in 16- and 64-QAM when $N_T=N_R=2$.
Figure 8:
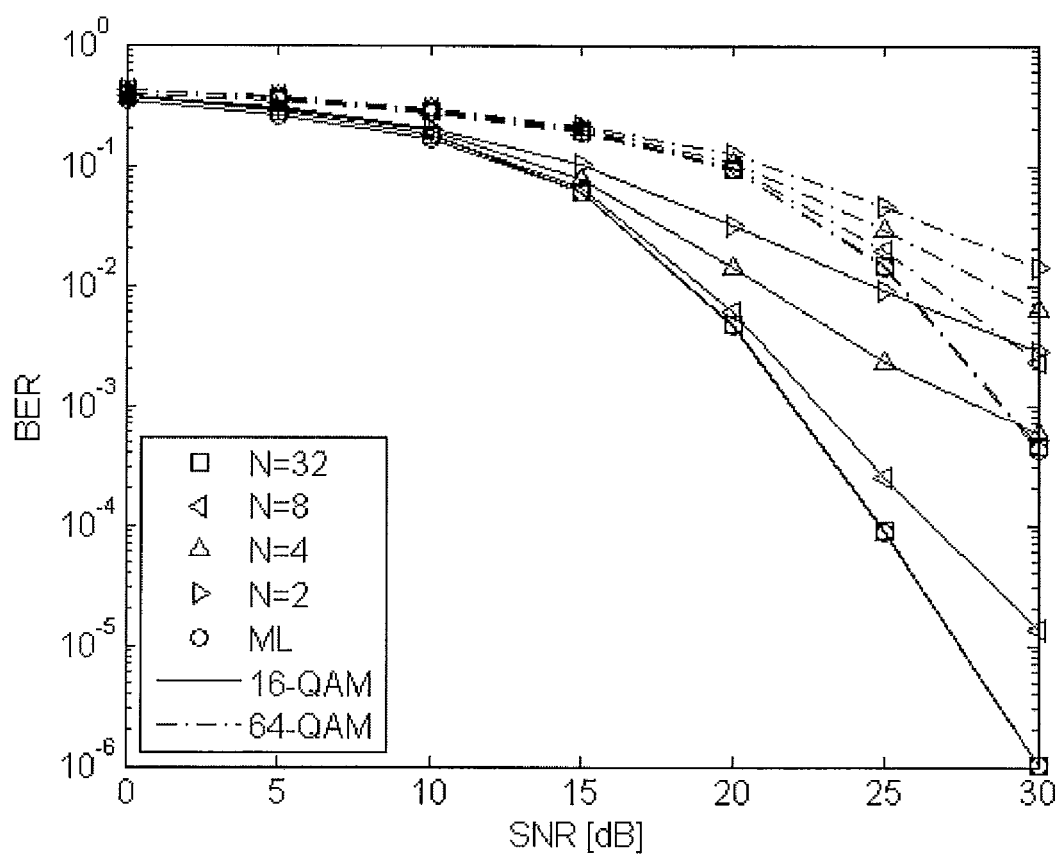
FIG. 8 shows the BER performance of the DELTA for various values of N in 16- and 64-QAM when $N_T=N_R=4$.
Figure 9:
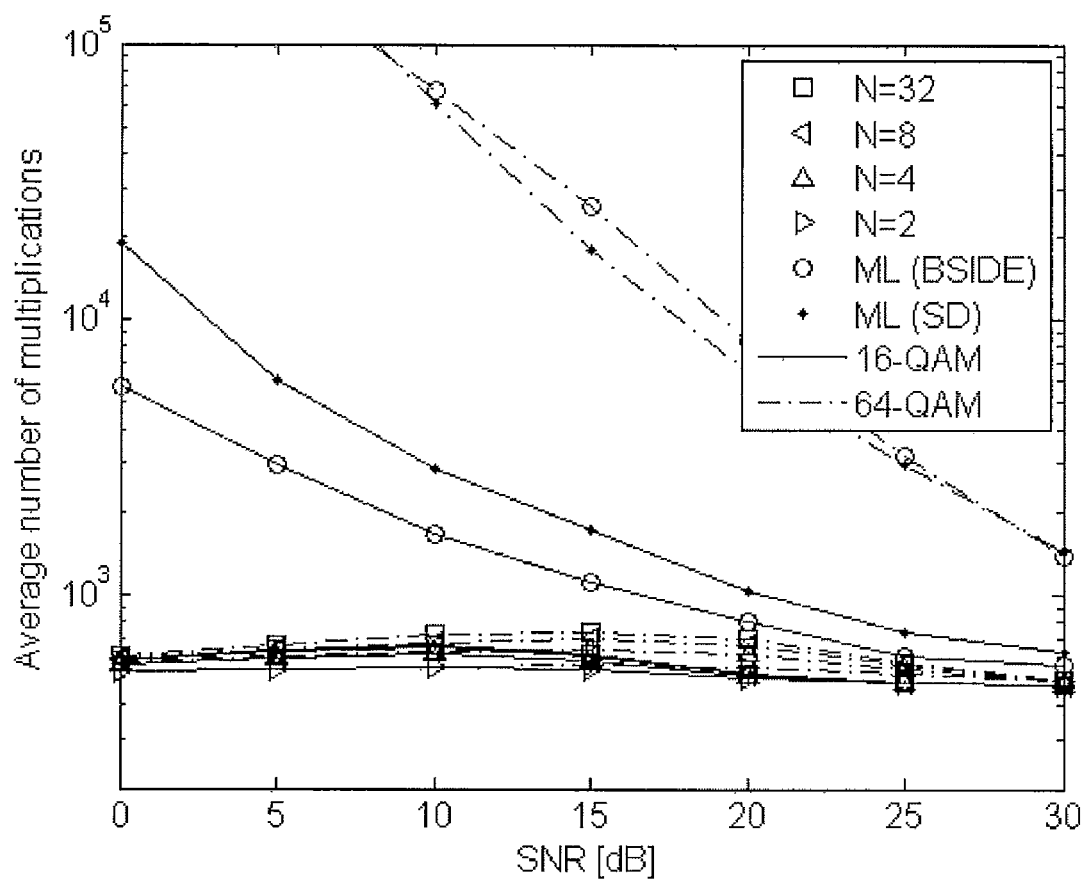
FIG. 9 shows the average number of multiplications of the DELTA for various values of N in 16- and 64-QAM when $N_T=N_R=4$.

A flow chart of the DELTA and an example depicting the application of the DELTA when m=4, L=16, and N=16 are shown in FIGS. 3 and 4, respectively. In FIG. 4, the number inside a node denotes the order of the formation of the node.

By employing the metric-first search method, the branch length threshold, and SE enumeration, the DELTA avoids unnecessary connections of nodes and backtracking as much as possible. Therefore, the DELTA can offer significant reduction in the computational complexity compared to other near ML schemes. The QRD-Stack is also based on the metric-first search as the DELTA, but does not make use of a threshold and the SE enumeration. When a best node is determined, the QRD-Stack connects all branches from the best node while the DELTA connects only the best branches from the best and its parent nodes if the best node deserves further consideration. The efficient QRD-M is based on the breadth-first search method and reduces the number of nodes retained in each layer by using a threshold. The efficient QRD-M compares node metrics of leaf nodes with the threshold to discard hopeless leaf nodes and connects all branches from the leaf nodes retained. In addition, the efficient QRD-M computes the threshold by using the partial DFE in every layer while the DELTA computes the threshold by using the channel matrix only when necessary. Like the DELTA, the SE2 employs the SE enumeration to consider one branch at a time starting from the best branch of a leaf node. However, since the SE2 is based on the depth-first search, the SE2 can consider only one leaf node at a time during the search while the DELTA considers a number of leaf nodes simultaneously during the search. FIG. 5 summarizes some of the key characteristics of various near ML decoding schemes.

Because the computational complexity from the channel estimation and channel decoding does not depend on the specific choice of a decoder and the computational complexity from adders and look-up tables is sufficiently small compared to that from multipliers, the relative complexity of decoders are normally compared by the number of multiplications for convenience in most of the studies. Based on this rationale, the computational complexity of decoders for MIMO systems is obtained and evaluated by means of the number of multiplications in this invention also.

In the preprocessing step of the decoding, performing QRD of the channel matrix H and computing $Q^T y$ require approximately $2 \, m^3/3$ and $m^2$ multiplications, respectively. Let us next take a look at the number of multiplications required for each of the steps in the DELTA. Clearly, no multiplication is needed for Steps 1, 2, and 2-1. In Step 2-2, to obtain the threshold, we first compute the volume of the k-dimensional Voronoi region which requires (k−1) multiplications and then multiply the volume by a constant $\Gamma(k/2+1)/\pi^{k/2}$. Here, we assume that the constants $$\left\{ \frac{\left[\Gamma\left(\frac{k}{2}+1\right)\right]^m}{\pi^{\frac{k}{2}}} \right\}_{k=1} \quad (46)$$

are available at the receiver, and that the k-th root in (21) has the same computational complexity as (k−1) multiplications. Then, computing the threshold $\gamma_k^2$ requires $$(k-1)+1+(k-1)+1=2k \quad (47)$$

multiplications. In Step 3, when a new leaf node is generated each from the best and its parent nodes, (m−k+4) and 2 multiplications are required to decide the best branch and compute the node metric, respectively.

Let us briefly consider the minimum number of multiplications in the decoding with the DELTA. In the best case, quite frequent at the high SNR, the DELTA searches the tree and neither backtracking nor comparison with the threshold occurs. In the best case, the DELTA connects only (2m−1) nodes for the decoding, and requires $$\frac{2}{3}m^3 + \frac{3m^2 + 9m}{2} - 2 \quad (48)$$

multiplications in all the steps including the preprocessing step.

Since various cases occur randomly under the influence of the SNR when a tree is searched in practical environment, on the other hand, the minimum number of multiplications is apparently not an adequate indicator in the examination of the computational complexity of a decoder. Therefore, we evaluate and compare the computational complexity of decoders in terms of the average number of multiplications obtained as the average over $10^6$ Monte-Carlo runs through computer simulations.

Let us now evaluate the computational complexity of the DELTA and other decoders. In the simulations, it is assumed that the transmitter has no channel state information and all symbols are transmitted with the equal energy $$E_s = \frac{E_{tot}}{N_T} \quad (49)$$

over a rich-scattering and flat Rayleigh fading channel, where $E_{tot}$ is the total energy used over one symbol duration at the transmitter. Then, the SNR at each receive antenna is expressed as $$\frac{E_s N_T}{\sigma^2}. \quad (50)$$

In the simulation, we evaluate and compare the BER performance and computational complexity of the DELTA, QRD-Stack, efficient QRD-M, SE2, and IRA for several QAM constellations and numbers of antennas. The performance of two representative ML decoders, the BSIDE and SD, is also considered and compared with the near ML decoders. In the evaluation of the computational complexity, the complexity in the preprocessing is taken into account.

FIGS. 6-9 show the variation of the BER performance and computational complexity of the DELTA when the value N of leaf nodes retained varies. It is interesting to see that the computational complexity of the DELTA barely increases while the BER performance improves considerably when the value of N increases. Specifically, in both 16- and 64-QAM, N=8 and 32 would be quite reasonable choices when $N_T=N_R=2$ and $N_T=N_R=4$, respectively.

Figure 10:
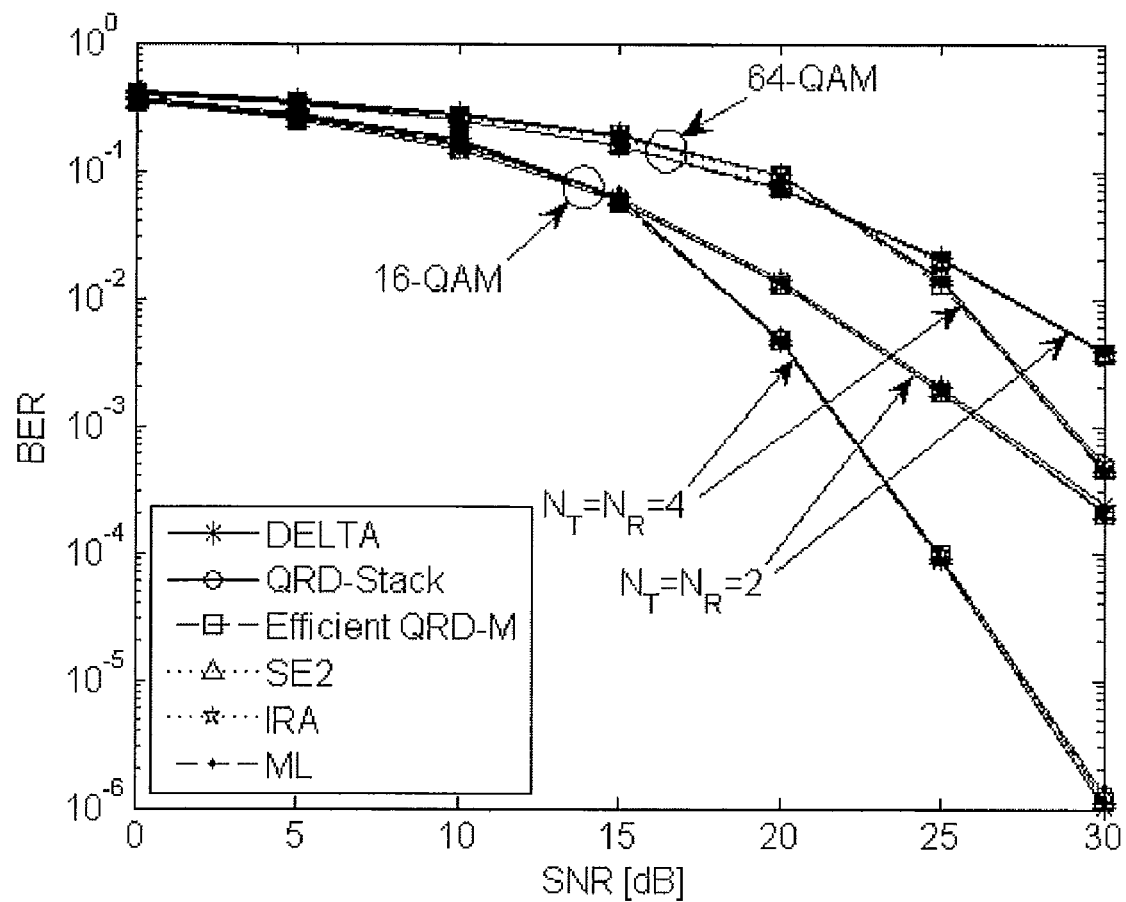
FIG. 10 shows the BER performance of various MIMO decoding schemes in 16- and 64-QAM when $N_T=N_R=2$ and 4.
Figure 11:
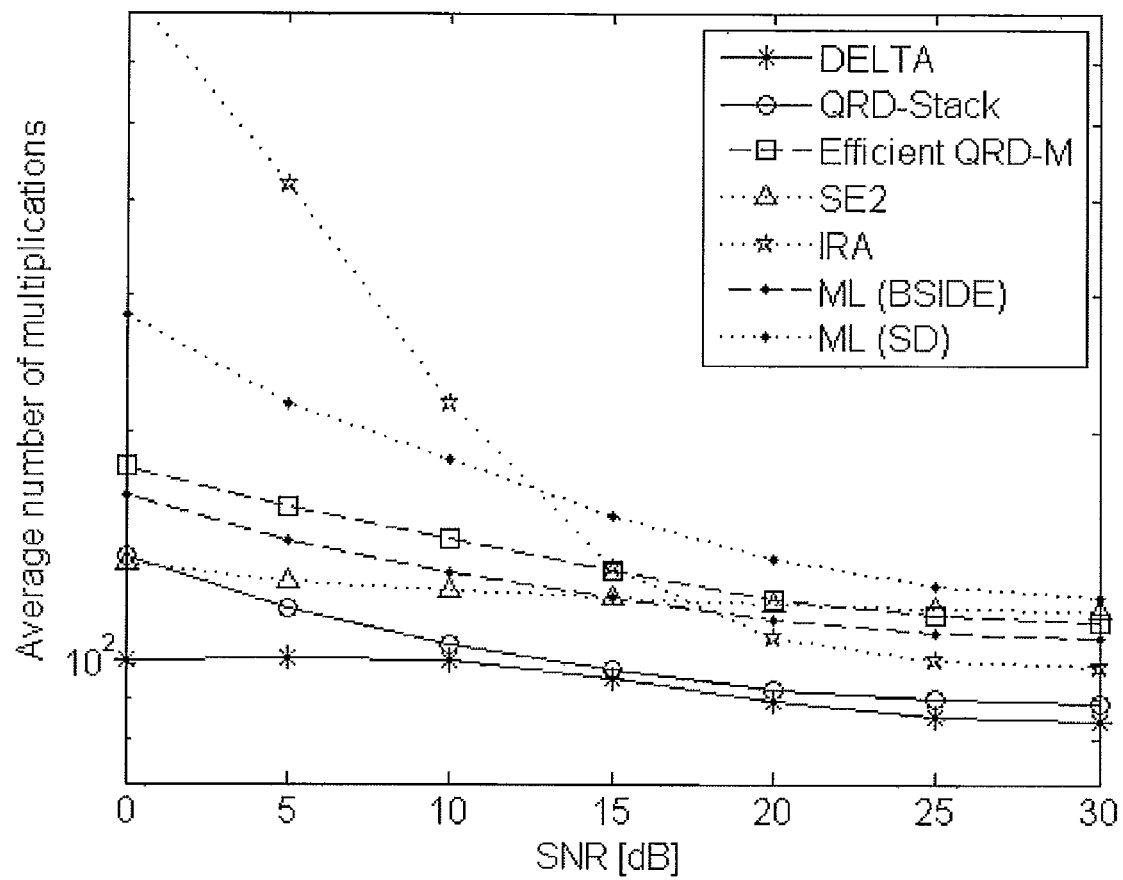
FIG. 11 shows the average number of multiplications of various MIMO decoding schemes in 16-QAM when $N_T=N_R=2$.
Figure 12:
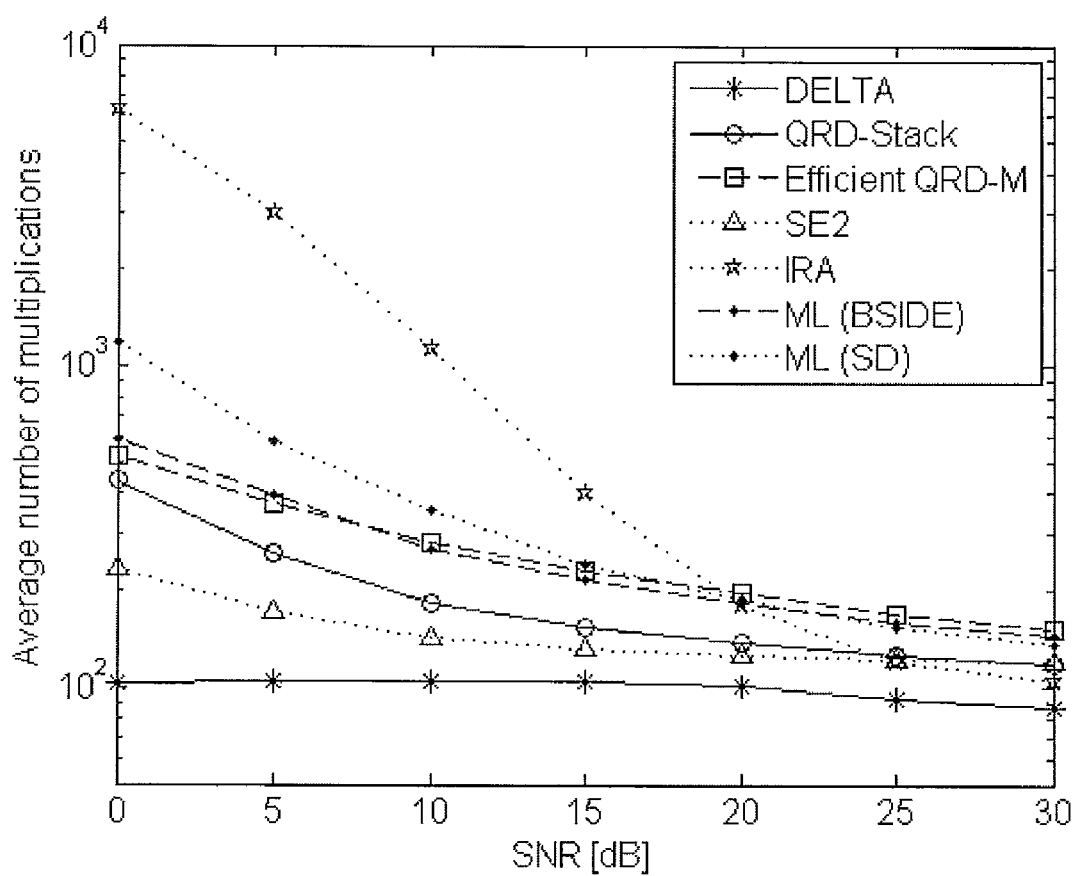
FIG. 12 shows the average number of multiplications of various MIMO decoding schemes in 64-QAM when $N_T=N_R=2$.
Figure 13:
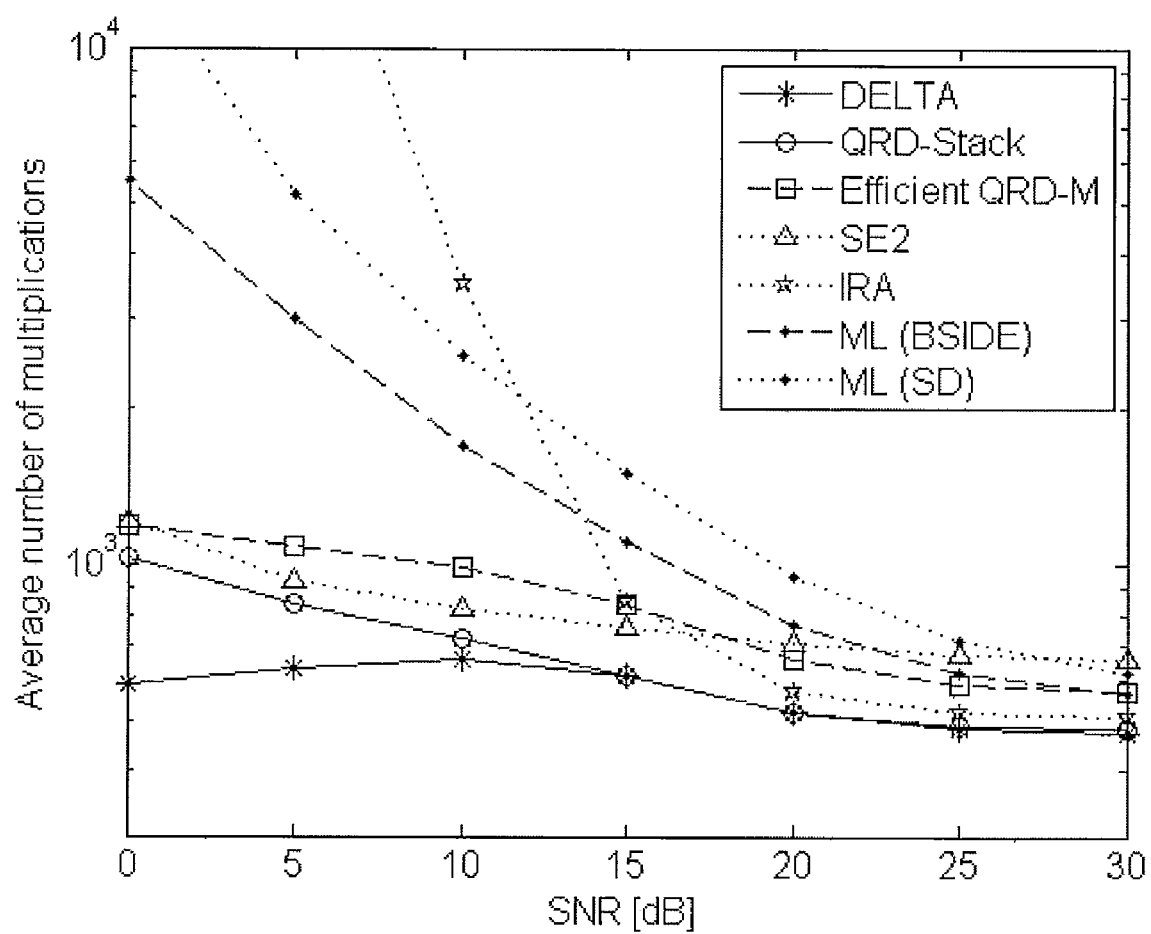
FIG. 13 shows the average number of multiplications of various MIMO decoding schemes in 16-QAM when $N_T=N_R=4$.
Figure 14:
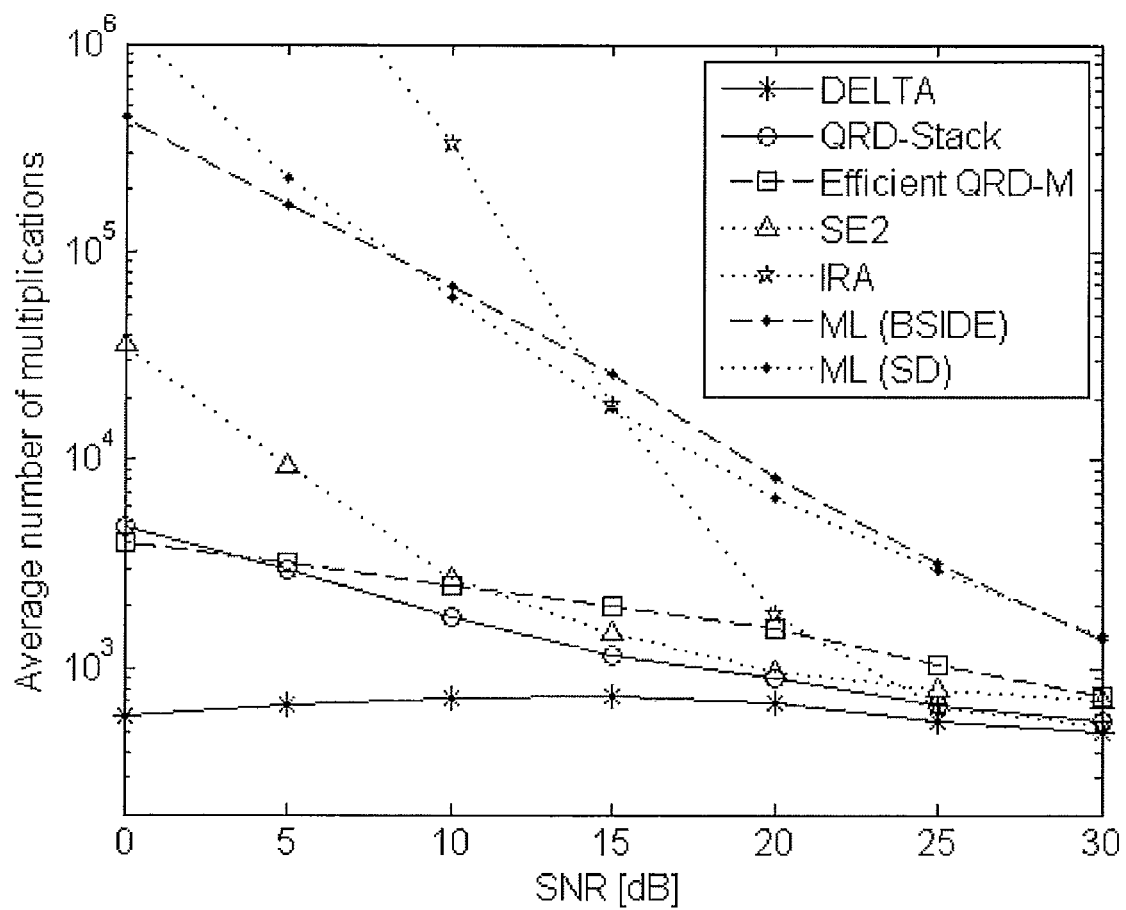
FIG. 14 shows the average number of multiplications of various MIMO decoding schemes in 64-QAM when $N_T=N_R=4$.

FIG. 10 shows the BER performance as a function of the SNR for various numbers of antennas and sizes of signal constellation. In the DELTA, efficient QRD-M, and QRD-Stack, the number N of nodes retained is set equally to L in the L-QAM constellation so that the efficient QRD-M and QRD-Stack can also exhibit near ML performance. It is observed that the DELTA and other near ML decoders have almost the same BER performance, all very close to the optimal BER performance.

FIGS. 11-14 show the average number of multiplications plotted as a function of the SNR for various numbers of antennas and sizes of signal constellation, where the initial radius for the SD was obtained by the DFE algorithm. The solid, dashed, and dotted lines are used to signify decoders based on the metric-, breadth-, and depth-first search methods, respectively. We can observe that the DELTA generally has lower computational complexity than other near ML decoders in terms of the average number of multiplications. In addition, the gain in the computational complexity of the DELTA is more noticeable at low SNR and is quite robust to the variations of the size of signal constellation and SNR. Although the QRD-Stack is also based on the metric-first search, the computational complexity of the QRD-Stack increases as the size of signal constellation increases, especially at low SNR.

It is interesting to observe that the DELTA incurs the highest computational complexity when the SNR is moderate while other decoders exhibit higher computational complexity when the SNR is lower. A possible explanation for this is as follows. First, as the SNR decreases with the signal power fixed, the average length of a branch would get longer with the noise variance, while the threshold $\gamma_k^2$ is not influenced by the SNR. Thus, the number of branches with lengths longer than the threshold would increase and more branches would be discarded as the SNR decreases, resulting in reduced computational complexity of the DELTA. Secondly, as the SNR increases with the signal power fixed, the average length of the best branch of a best node would get shorter, and therefore, the child node of the best node would have a higher probability of becoming a new best node. In other words, as the SNR increases, best nodes would be generated mostly in the forward direction with less 'side' branches and the search would reach the first layer sooner, resulting in lower computational complexity. Due to these two conflicting characteristics, the DELTA exhibits the highest computational complexity when the SNR is moderate.

Figure 15:
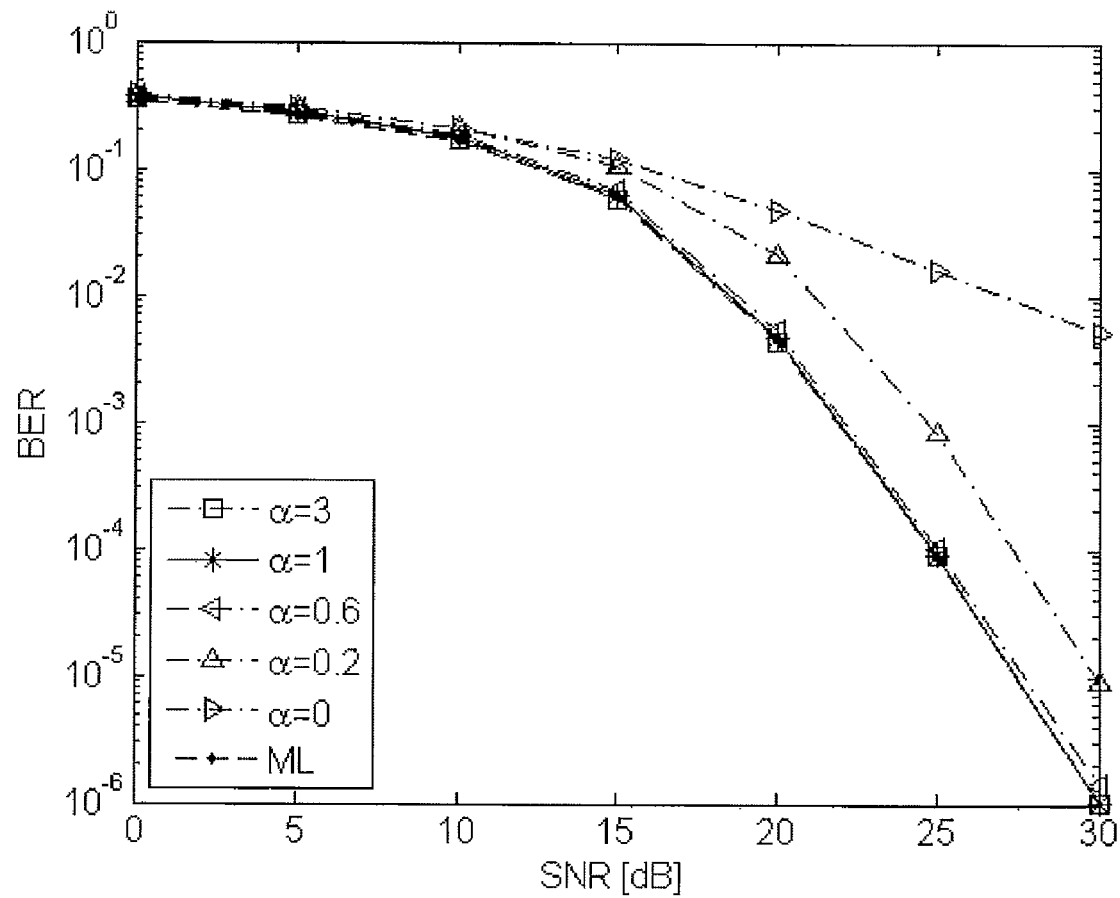
FIG. 15 shows the BER performance of the DELTA for various values of $\alpha$ in 16-QAM when $N_T=N_R=4$.
Figure 16:
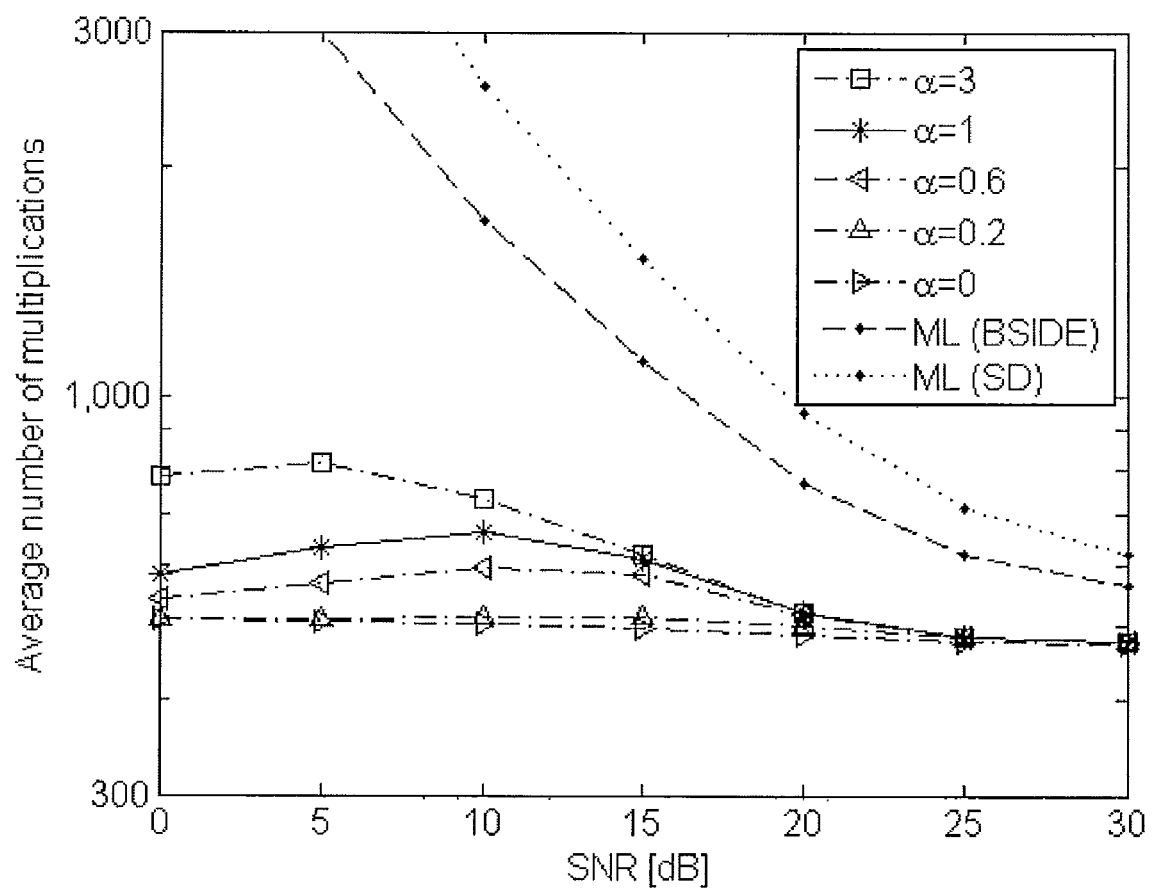
FIG. 16 shows the average number of multiplications of the DELTA for various values of $\alpha$ in 16-QAM when $N_T=N_R=4$.

The DELTA can in addition allow flexible tradeoffs between the BER performance and computational complexity by changing the threshold adaptively. FIGS. 15 and 16 show the variation of the BER performance and computational complexity, respectively, of the DELTA when the threshold is multiplied by a positive constant $\alpha$ for N=16, $N_T=N_R=4$, and 16-QAM. As $\alpha$ gets close to 0, the BER performance deteriorates and the computational complexity decreases (which, by the way, becomes eventually almost constant at all SNR). Clearly, because the BER performance of the DELTA is already very close to the ML performance when $\alpha=1$, the gain in the BER performance is negligible when $\alpha>1$ and adaptation of the threshold with $\alpha>1$ is not useful.

What is claimed is:

1. The method of decoding received signals in MIMO systems, the method performed by an apparatus and comprising:

calculating, by the apparatus, a threshold by approximating a k-dimensional Voronoi region $v(\Lambda_k(R_k),s_k)$ by a k-dimensional hypersphere with the same volume, where a volume of the k-dimensional Voronoi region is obtained by using the following equations, $$Vol(V(\Lambda_k(R_k), s_k)) = Vol(V(\Lambda(R_k), s_k))$$

and $$Vol(V(\Lambda(R_k), s_k)) = \sqrt{\det(R_k^T R_k)}$$
$$= \prod_{i=1}^{k} |r_{i,i}|,$$

where, $v(\Lambda_k(R_k),s_k)=\{r_k' \in \mathbb{R}^k : \|r_k'-R_k s_k\| \leq \|r_k'-R_k \tilde{s}_k\|, \forall R_k \tilde{s}_k \in \Lambda_k(R_k)\}$ is the Voronoi region of the lattice point $R_k s_k$ in the lattice $\Lambda_k(R_k)$, $\mathbb{R}$ is a set of real numbers, $\Lambda_k(R_k) = \{R_k s_k : s_k \in A^k\}$ is the k-dimensional finite lattice generated by a k-dimensional submatrix $R_k$ of R, $A=\{-(\sqrt{L}-1)/2, -(\sqrt{L}-3)/2, \ldots, (\sqrt{L}-3)/2, (\sqrt{L}-1)/2\}$ is the signal constellation of L-QAM with L=4, 16, ..., $\Lambda_k(R_k)=\{R_k s_k : s_k \in A_\infty^k\}$ is a k-dimensional infinite lattice generated by the k-dimensional submatrix $R_k$ of R, $A_\infty=\{a+0.5 : a \in \mathbb{Z}\}$, $\mathbb{Z}$ is a set of all integers, and $r_{j,i}$ is and i-th diagonal element of the upper triangular matrix $R=[r_{i,j}]$ when a channel matrix H is QR decomposed.

2. The method of claim 1, wherein the apparatus includes a decoder which is used to calculate the threshold.

* * * * *